United States Patent [19]

Tanaka et al.

[11] Patent Number: 4,500,551

[45] Date of Patent: Feb. 19, 1985

[54] AGENTS FOR IMPROVING BREAD IN QUALITY AND BREAD CONTAINING SAME

[75] Inventors: Kenji Tanaka, Kawagoe; Shigeru Endo, Tokyo, both of Japan

[73] Assignee: Nisshin Flour Milling Co., Ltd., Tokyo, Japan

[21] Appl. No.: 489,592

[22] Filed: Apr. 28, 1983

Related U.S. Application Data

[63] Continuation of Ser. No. 359,134, Mar. 17, 1982, abandoned.

[51] Int. Cl.³ ............................ A21D 2/06; A21D 2/22
[52] U.S. Cl. .......................................... 426/62; 426/23; 426/25; 426/653; 426/19
[58] Field of Search ..................... 426/19, 23, 25, 653, 426/656, 549, 62

[56] References Cited

U.S. PATENT DOCUMENTS 2,280,031  4/1942  Weber .................................. 426/23

OTHER PUBLICATIONS

Rubenthaler et al., Food Technology, vol. 19, No. 11, p. 99, 1965, "Effects of Glutamic Acid and Related Compound on Bread Characteristics".
Isen, The Bakers Digest, 10/64, pp. 44-47, "Ascorbic Acid as a Flour Improver".

Primary Examiner—Raymond Jones
Assistant Examiner—Elizabeth A. King
Attorney, Agent, or Firm—Abelman, Frayne, Rezac & Schwab

[57]  ABSTRACT

Bread dough is improved by the addition therein of a composition containing L-ascorbic acid, cystine and aspartic acid or glutamic acid.

6 Claims, No Drawings

AGENTS FOR IMPROVING BREAD IN QUALITY AND BREAD CONTAINING SAME

This is a continuation of application Ser. No. 359,134 filed Mar. 17, 1982, now abandoned.

This invention relates to compositions for use in obtaining bread of good quality.

Various attempts have heretofore been made not only to increase bread in volume but also make its inner and outer phases favorable in appearance and improve its taste. For instance, a L-ascorbic acid is used as an additive to a dough for attaining such purposes. This means, however, was not found satisfactory in terms of its operational procedure as well as quality control of the resulting bread, though the resultant bread was apparently increased in volume to a certain extent.

As a result of extensive studies, we have found that bread of extremely good quality can be obtained by using in a dough ready for baking a composition comprising a combination of L-ascorbic acid, cystine and either one or both of aspartic acid and glutamic acid.

The term "bread" as used herein is intended to designate those obtained by baking or frying in oil a dough which has been prepared by incorporating and mixing wheat fluor with bread yeast, water and the like additives, and optionally other additional materials if necessary. This term "bread" also includes those obtained by incorporating a dough with bread corns other than wheat, for example, rye flour, in addition to the above-mentioned materials.

The term "a L-ascorbic acid" as used herein is intended to designate to include L-ascorbic acid and dehydro-ascorbic acid as well as their salts.

Cystine, which is one of the constituents of the present agent for improving bread in quality, is preferably incorporated into a dough in an amount of 2.5 to 10 parts by weight based on the ascorbic acid used. If the amount of cystine incorporated into a dough is exceedingly large, the dough becomes poor in its structure and becomes loose during fermentation, and consequently said dough during baking will have poor oven-spring. Further, the bread thus obtained is found unsatisfactory in grain and crumb texture because of insufficient expansion of the cell walls. When the incorporated amount of cystine is exceedingly small, the resulting dough becomes sticky at the time of feeding it into an oven and will also have poor oven-spring. The bread thus obtained is hard in texture and not preferable.

Aspartic acid or glutamic acid, which is the other constituent, is preferably incorporated into a dough in an amount of 0.5 to 2 parts by weight based on the ascorbic acid used. If the amount of aspartic acid or glutamic acid incorporated is exceedingly large, the resulting dough becomes sticky at the time of charging it into an oven and consequently will have poor oven-spring and, on the contrary, when said amount is exceedingly small, the resulting dough tightens at the time of charging it into an oven, with the result that the resulting bread is unfavorably found unsatisfactory in grain and crumb texture because of insufficient expansion of the cell walls. Of these constituents, aspartic acid exhibits more excellent effect than glutamic acid does.

The aforementioned bread quality improving agents may be added to a dough and thoroughly kneaded therewith at the stage of kneading the dough during the course of the steps of producing bread. The improving agent may be suitably used in a proportion of 30-120 ppm of the weight of the starting wheat flour. Particularly preferably, the proportion ranges from 30 to 40 ppm when a straight dough method is employed, or ranges from 40 to 60 ppm when a sponge dough method is employed. In the case where a quick method is employed, aspartic acid is suitably used in a proportion of 90-120 ppm and glutamic acid in a proportion of 60-120 ppm, both are based on the weight of the starting wheat flour. When the amount of the improving agent used is excessively large, the resulting dough becomes sticky and the bread obtained therefrom is found coarse in its inner phase with poor texture. On the other hand, if the amount of the agent used is excessively small, the resulting dough will harden and have poor oven-spring, thereby producing bread whose grain and crumb texture is poor because of insufficient expansion of the cell walls.

By virtue of incorporation into a dough of the present improving agent, it is possible to obtain bread, whose volume is sufficiently large and whose outer phase (color and nature), inner phase (crumb grain, color of crumb) and texture (feeling obtained by pressing the texture with a finger) are found satisfactory. In addition, the handling of a dough is easy as the dough is not excessively sticky. The effect of the present improving agent is exhibited remarkably where no oxidizing agent is employed in the dough.

The effectiveness of the present invention will be demonstrated hereinafter. That is, various bread products were produced according to a sponge dough method by adding the additives in Table 1 to the under-mentioned sponge dough formula and bread-making dough formula. The yeast food as referred to in the sponge dough formula consists of calcium carbonate, calcium sulfate, ammonium chloride, calcium monophosphate, calcium diphosphate, malted rice, malt enzyme and starch.

| [Sponge dough formula] | |
|---|---|
| Wheat flour | 1400 g |
| Yeast | 40 g |
| Yeast food | 2 g |
| Water | 800 cc |
| [Bread-making dough formula] | |
| Wheat flour | 600 g |
| Salt | 40 g |
| Sugar | 120 g |
| Margarine | 40 g |
| Shortening | 60 g |
| Powdered milk | 40 g |
| Water | 520 cc |

TABLE 1

| | Ascorbic acid | Cystine | Aspartic acid |
|---|---|---|---|
| Present invention (1) | 1 | 3.8 | 1 |
| Present invention (2) | 1 | 3.8 | 2 |
| Control | 0 | 0 | 0 |
| Comparison (1) | 1 | 4 | 0 |
| Comparison (2) | 1 | 0 | 4 |

(Notes)
All the figures represent the mixing proportions of the additives used, and the sum total of amounts of the additives was controlled in each case so that the total amount became 50 ppm relative to the weight of the wheat flour, except for the case of the control.

The thus produced bread products were compared in volume, inner phase, outer phase and texture. The results obtained are shown in Table 2, in which each of the symbols denotes as follows:

| | |
|---|---|
| ◎ | Very good |
| ○ | Good |
| △ | Ordinary |
| X | Poor (of no commercial value) |

TABLE 2

| | Volume (cc) | Outer phase | Inner phase | Texture |
|---|---|---|---|---|
| Present invention (1) | 2030 | ◎ | ◎ | ◎ |
| Present invention (2) | 2070 | ○ | ○ | ◎ |
| Control | 1720 | X | X | X |
| Comparison (1) | 1980 | △ | △ | |
| Comparison (2) | 1940 | △ | △ | △ |

The test results shown in Table 3 were obtained by repeating exactly the same bread-making procedure as above, except that glutamic acid was used in place of the aspartic acid.

TABLE 3

| | Volume (cc) | Outer phase | Inner phase | Texture |
|---|---|---|---|---|
| Present invention (1) | 2030 | ◎ | ◎ | ◎ |
| Present invention (2) | 2070 | ○ | ○ | ◎ |
| Control | 1750 | X | X | X |
| Comparison (1) | 1990 | △ | △ | |
| Comparison (2) | 1970 | △ | △ | △ |

EXAMPLE 1

A bread quality improving agent was obtained by mixing together 2 mg of L-ascorbic acid, 2 mg of aspartic acid and 8 mg of L-cystine. The agent was incorporated into the under-mentioned dough, and the resulting dough was kneaded. The thus obtained dough was treated under the following bread-making conditions to obtain loaf bread.

| [Dough formula] | |
|---|---|
| Wheat flour | 300 g |
| Yeast | 6 g |
| Yeast food | 0.3 g |
| Sugar | 15 g |
| Salt | 6 g |
| Shortening | 12 g |
| Water | 219 cc |
| [Bread-making conditions] | |
| First fermentation | 75 minutes at 27° C. |
| Second fermentation | 25 minutes at 27° C. |
| Drier | 50 minutes at 35° C. |
| Baking | 35 minutes at 200° C. |

EXAMPLE 2

A bread quality improving agent was obtained by mixing together 35 mg of dehydro-ascorbic acid, 18 mg of glutamic acid and 250 mg of L-cystine. The agent thus obtained was incorporated into the under-mentioned sponge dough formula, and the resulting dough was kneaded together. The thus obtained dough was fermented at 250° C. for 4 hours. To the dough thus fermented was added a material according to the under-mentioned dough formula, followed by kneading. The resultant dough was baked under the below-indicated bread-making conditions to obtain confectionary bread.

| [Sponge dough formula] | |
|---|---|
| Wheat flour | 3500 g |
| Yeast | 125 g |
| Yeast food | 5 g |
| Water | 1950 cc |
| [Dough formula] | |
| Wheat flour | 1500 g |
| Sugar | 750 g |
| Salt | 70 g |
| Shortening | 250 g |
| Egg | 250 g |
| Powdered milk | 100 g |
| Water | 780 cc |
| [Bread-making conditions] | |
| Floor time | 10 minutes |
| Bench time | 15 minutes |
| Drier | 50 minutes at 38° C. |
| Baking | 10 minutes at 210° C. |

EXAMPLE 3

A bread quality improving agent was obtained by mixing together 6.6 mg of L-ascorbic acid, 13.2 mg of aspartic acid and 16.2 mg of cystine. The agent thus obtained was incorporated into the under-mentioned dough, followed by kneading. The resultant dough was baked under the below-indicated bread-making conditions to obtain loaf bread.

| [Dough formula] | |
|---|---|
| Wheat flour | 300 g |
| Yeast | 9 g |
| Yeast food | 0.75 g |
| Sugar | 15 g |
| Salt | 6 g |
| Shortening | 12 g |
| Water | 219 cc |
| [Bread-making conditions] | |
| Floor time | 20 minutes at 27° C. |
| Bench time | 20 minutes at 27° C. |
| Drier | 60 minutes at 35° C. |
| Baking | 35 minutes at 200° C. |

What we claim is:

1. An agent for improving bread in quality, said agent containing L-ascorbic acid, cystine and aspartic acid or glutamic acid in the proportion of 1 part by weight of ascorbic acid, 2.5 to 10 parts by weight of cystine based on the ascorbic acid used and 0.5 to 2 parts by weight of aspartic acid or glutamic acid based on the ascorbic acid used, said agent being present as 30–120 ppm of the weight of the flour.

2. In a yeast bread flour dough, the improvement which comprises an agent incorporated therein consisting of (1) L-ascorbic acid, (2) cystine and (3) an acid selected from the group consisting of aspartic acid and glutamic acid in the proportion in parts by weight of 1 part of (1), 2.5 to 10 parts of (2) based on the ascorbic acid used and 0.5 to 2 parts of (3) based on the ascorbic acid used, said agent being present in the amount of 30–120 ppm by weight of the flour.

3. The bread dough as claimed in claim 2, wherein said dough is a straight dough and said agent is present in the amount of 30 to 40 ppm.

4. The bread dough as claimed in claim 2, wherein said dough is a sponge dough and said agent is present in the amount of 40 to 60 ppm.

5. In a yeast bread flour dough, the improvement which comprises an agent incorporated therein consisting of (1) ascorbic acid, (2) cystine and (3) aspartic acid in the proportion of 1 part of (1), 2.5 to 10 parts of (2) based on the ascorbic acid used and 0.5 to 2 parts of (3) based on the ascorbic acid used, wherein the aspartic acid is present in the amount of 90–120 ppm based on the weight of the flour.

6. In a yeast bread flour dough, the improvement which comprises an agent incorporated therein consisting of (1) ascorbic acid, (2) cystine and (3) glutamic acid in the proportion of 1 part of (1), 2.5 to 10 parts of (2) based on the ascorbic acid used and 0.5 to 2 parts of (3) based on the ascorbic acid used, wherein the glutamic acid is present in the amount of 60–120 ppm based on the weight of the flour.

* * * * *